United States Patent
Gebauer

(10) Patent No.: US 9,528,682 B2
(45) Date of Patent: Dec. 27, 2016

(54) LIGHT CONDUCTOR WITH A RIBBON-SHAPED LIGHT EMITTING AREA

(71) Applicant: Automotive Lighting Reutlingen GmbH, Reutlingen (DE)

(72) Inventor: Matthias Gebauer, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 191 days.

(21) Appl. No.: 14/102,798

(22) Filed: Dec. 11, 2013

(65) Prior Publication Data
US 2014/0177255 A1   Jun. 26, 2014

(30) Foreign Application Priority Data
Dec. 20, 2012  (DE) .................. 10 2012 224 079

(51) Int. Cl.
  *F21V 13/04*  (2006.01)
  *F21V 7/00*   (2006.01)
  (Continued)

(52) U.S. Cl.
  CPC .............. *F21V 7/0091* (2013.01); *F21S 48/00* (2013.01); *F21S 48/215* (2013.01); *F21S 48/2243* (2013.01); *F21S 48/2262* (2013.01); *F21S 48/2287* (2013.01); *F21V 7/0025* (2013.01); *F21V 7/06* (2013.01); *G02B 6/0018* (2013.01); *G02B 6/002* (2013.01)

(58) Field of Classification Search
CPC ......... G02B 6/002; G02B 6/0018; F21V 7/06; F21V 7/0091; F21V 7/0025; F21S 48/2287; F21S 48/2262; F21S 48/2243

USPC .......................................................... 362/511
See application file for complete search history.

(56) References Cited

U.S. PATENT DOCUMENTS 6,540,387 B2 * 4/2003 Hashiyama .......... B60Q 1/0052
                                                    362/247
7,025,482 B2   4/2006 Yamashita et al.
(Continued)

FOREIGN PATENT DOCUMENTS

DE   10 2005 003 367   5/2009
DE   10 2008 061 716   6/2010
(Continued)

OTHER PUBLICATIONS

Aug. 27, 2014 European Search Report for EP 13 19 3984.

*Primary Examiner* — Peggy Neils
(74) *Attorney, Agent, or Firm* — Howard & Howard Attorneys PLLC

(57) ABSTRACT

A light conductor with an input coupler which couples in light in such a way that inside the light conductor it is distributed into a first layer, parallel layers and into second layers, whereby each second layer is spanned by a perpendicular of the first layer and by a line located in the first layer, and with a light emitting area. Light is coupled such that it has a lower divergence in the second layers than in the first layers. There is a first deflection area between the input coupler and the light emitting area, which redirects light emitted from the input coupler incident on it in an angle bigger than the double of the critical angle of the total internal reflection. Further deflection areas are illuminated with light emitted from the first deflection area and direct the incident light into a preferred common direction for the further deflection areas.

15 Claims, 5 Drawing Sheets

(51) Int. Cl.
*F21S 8/10* (2006.01)
*F21V 7/06* (2006.01)
*F21V 8/00* (2006.01)

(56) References Cited

U.S. PATENT DOCUMENTS

| | | | |
|---|---|---|---|
| 7,419,287 B2* | 9/2008 | Gasquet | F21S 48/215 362/511 |
| 7,837,370 B2 | 11/2010 | Bierhuizen et al. | |
| 8,434,892 B2* | 5/2013 | Zwak | G02B 6/0018 362/235 |
| 2005/0152141 A1* | 7/2005 | Suzuki | B60Q 1/0052 362/241 |
| 2006/0171159 A1 | 8/2006 | Anderlini | |
| 2007/0236909 A1 | 10/2007 | Tamura | |
| 2011/0261570 A1* | 10/2011 | Okada | F21S 48/215 362/311.06 |

FOREIGN PATENT DOCUMENTS

| | | |
|---|---|---|
| EP | 1674789 A2 | 6/2006 |
| EP | 1684002 A2 | 7/2006 |
| EP | 1881265 A1 | 1/2008 |
| EP | 2270389 A1 | 1/2011 |
| FR | 2841967 A1 | 7/2003 |

* cited by examiner

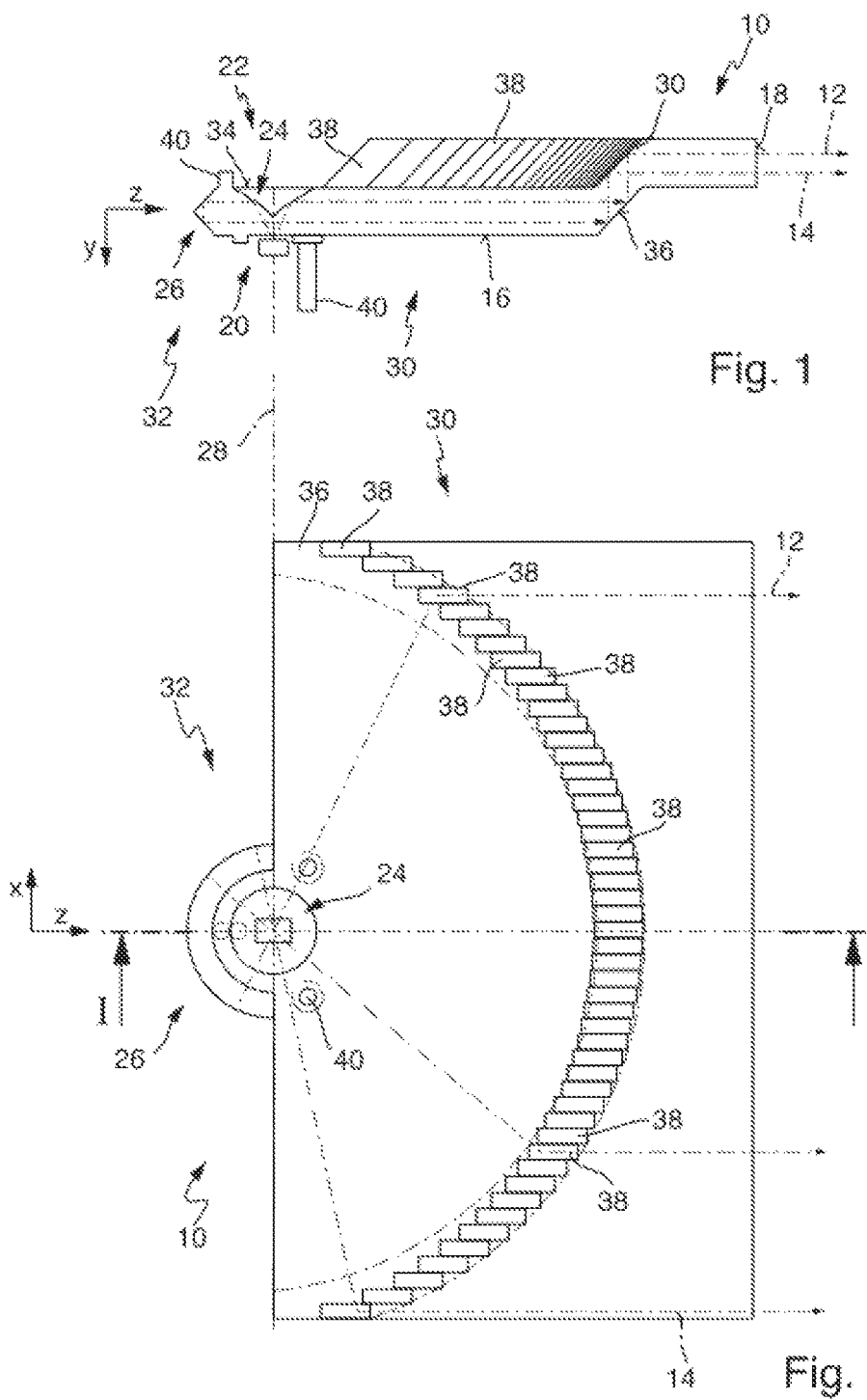

LIGHT CONDUCTOR WITH A RIBBON-SHAPED LIGHT EMITTING AREA

CROSS-REFERENCE TO RELATED APPLICATION

This application is based upon and claims priority to published German patent application, 10 2012 224 079.9 filed on Dec. 20, 2012.

BACKGROUND OF INVENTION

1. Field of Invention

The present invention concerns a light conductor.

2. Description of the Related Art

The present invention relates to a light conductor. Such a light conductor is known from published German patent application DE 199 25 363 A1 and consists of an input coupler arranged so that divergent incident light is coupled into the inside of the light conductor in such a way that the coupled in light inside the light conductor is distributed into a first layer, parallel layers, and second layers, whereby each second layer is spanned by a normal of the first layer and by a line located in the first layer. Further, the known light conductor includes a ribbon-shaped light emitting area.

Divergence refers to the diverging of light beams. A divergent beam is a light beam which has an opening angle diverging from zero. A parallel light beam could be allocated to an opening angle of zero.

The light conductor known in the art is plate-shaped and consists of extended boundary areas (which are parallel to each other) and narrow side areas (which connect the plate-shaped boundary areas to each other).

The first layers are parallel to the extended boundary areas, which can also be described as broadsides of the plate-shaped light conductor. The second layers are perpendicular to it in the light conductor in such a way that the light rays inside the light conductor run within such second layers; these are imaginary layers whose location is defined by the direction of the light rays inside the light conductor. The ribbon-shaped light emitting area is located in a narrow side of the known plate-shaped light conductor.

In order to achieve a parallel light distribution in the light conductor in the direction towards the light emitting area, the light known in the art is designed such that the narrow side of the plate-shaped light conductor opposite of the ribbon-shaped light emitting side is arranged in the form of a reflector, which consists of parabolic contours in the first layers (or the areas parallel to the extended plate-shaped areas and perpendicular to this a prism-like contour) which redirects incident light twice. Thus, the reflector directs the divergent incident light as parallel light towards the ribbon-shaped light emitting area opposite the reflector.

A significant disadvantage of the light conductor known in the art is that radial emitted light (which reached directly into the half space facing the light emitting area) does not reach the reflector and is thus not parallelized. Yet, with respect to lighting equipment of motor vehicles (such as head light functions or signal light functions), a light emitting area that is as parallel as possible and shining as homogeneous (equally bright) as possible is desired. Such light has the advantage that it can be easily distributed into government regulated light distributions by subsequent optics. From an artistic point of view, a light conductor is further desired which features a ribbon-shaped light emitting area with a large ratio between the length of the light emitting area and its width and which fulfills these requirements (homogeneity, parallelism).

SUMMARY OF THE INVENTION

The present invention accomplishes this and distinguishes itself from the prior art in that the input coupler is designed so that light is coupled in such a way that it has a lower divergence in the second layers than in the first layers. Further, the light conductor consists of a first deflection area between the input coupler and the light emitting area, which redirects light emitted from the input coupler incident on the deflection area in an angle which is at least as big as the product of the value of the critical angle of the total internal reflection and the factor 2, and whereby the light conductor consists of further deflection areas which are illuminated with light emitted from the first deflection area and which direct the incident light from the first deflection area into a preferred direction for further common deflection areas.

Ideally, by these characteristics, a parallelization of the light in two perpendicular layers is achieved, wherein the parallelization of the one layer is accomplished spatially separate from the parallelization of the other layer. With the first parallelization, which is performed in the input coupler, the light expansion in the second layers is parallelized. At the same time, a pre-conditioning of the light for the second parallelizing step is performed, in which the light expansion in the first layers is parallelized. This is accomplished such that the second parallelizing step does not affect the results of the first parallelizing step.

Because the first deflection area is situated between the input coupler and the light emitting area, the light propagated there (which emits from the input coupler into the section of the light conductor facing the light emitting area) can be influenced in its direction. The redirection of the light by an angle which is at least as big as the product of the value of the critical angle of the total internal reflection and the factor 2 allows the redirection of any light incident on the first deflection area without any shading loss toward further deflection areas. Further deflection areas that are illuminated in such a way from the first deflection area allow for this incident light to be redirected (without any shading loss) into a preferred direction for further common deflection areas. By he common preferred direction, a light beam of parallel propagated light within the light conductor is created from the divergent coupled in light. Even if a full parallelism (opening angle is zero) is not accomplished, a great reduction of the divergence of the light distribution in these directions is achieved. The first deflection area is preferably arranged in such a way that it does not change the propagation direction of the light reflected on it in the respective first layer.

In one embodiment, the input coupler features a first reflector which formed as a parabola in the second layers, whose focal point is in the apparent origin of the divergent light beam of the light source. The first reflector is realized as a rotationally symmetric deepening in a boundary area opposite of the light incidence area of the light conductor. The depth of the deepening corresponds to a value between 40% and 60% of the distance between the boundary area in which the light incidence area is located and where the deepening is located (as if there was no deepening) and that of the boundary area opposite of the light incidence area of the light conductor. The input coupler consists of a second reflector in the first layers that feature a semicircular form which is concentrically to the circular shape of the first reflector. Further, the second reflector is positioned in a rear section of the light conductor and features a roof-shaped cross section whereby the point angle between the reflection areas and the roof edge reflector is 90°.

In another embodiment, the input coupler consists of a lens-shaped central area and a border area with parabolic external contours. The first deflection area is part of a boundary area of the light conductor and the further deflection areas are partial sections of a boundary area opposite to that boundary area. The first deflection area and the additional deflection areas consist of a respective angle to the first layers, which is smaller than the difference of a right angle and the boundary angle of the total internal reflection. For a boundary angle of the total internal reflection of 38°, the angle between each one of the deflection areas and the first layers is thus less than 52°. In one embodiment, the angle is consistently 45° each. The first deflection area and the second deflection areas are positioned and arranged in such a way that the light there is deflected by 90° respectively, whereby the alignment of the additional deflection areas is determined in such a way that the incident ray, the perpendicular to the deflection area and the reflected ray have to be in the same layer and that the direction of the reflected ray is the preferred direction. A line is arranged alongside the first deflection area in a first layer as a guiding line which serves for aligning further deflection areas. The guiding line, which is aligned alongside the individual first and additional deflection areas in their projections in the first layer, is defined by the radiation characteristics of the light conductor and the requirement that the light intensity distribution after the deflection in the additional deflection areas be homogeneous.

The guiding line has the shape of a section of a circumference. A section of the first deflection area for light from directions with comparatively lower light intensity is arranged closer to the input coupler than a section of the first deflection area that belongs to a partial beam with comparatively higher light intensity. In another embodiment, the guiding line is in the shape of a section of an ellipse.

Another aspect of the present invention refers to lighting equipment of a motor vehicle with at least one light conductor. The lighting equipment features at least two light emitting diodes which radiate light in different colors from the other and which are arranged so close to each other in front of a light incidence area of the light conductor, that their light is coupled into the same light conductor volume.

Further advantages result from the dependant claims, the description and the attached figures.

It is understood that the previously mentioned and the following, still to be explained characteristics can be used, not only in the respectively mentioned combinations, but also in other combinations or individually, without leaving the range of the invention.

BRIEF DESCRIPTION OF THE DRAWINGS

Embodiments of the invention are displayed in the drawings and will be further explained in the following descriptions. It is shown, in schematic form respectively:

FIG. 1 An embodiment of the light conductor in longitudinal section;

FIG. 2 A top view of the light conductor of FIG. 1;

DETAILED DESCRIPTION OF THE EMBODIMENTS OF THE INVENTION

Figure 3:
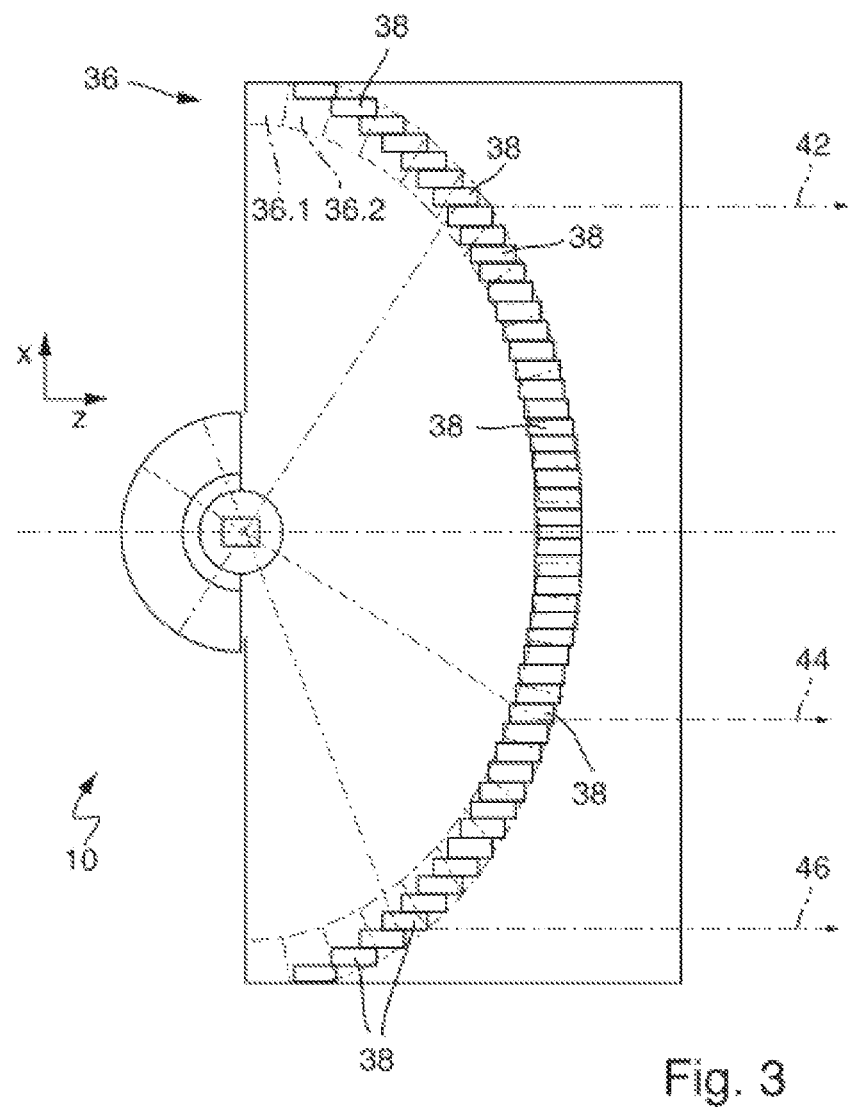
FIG. 3 A top view of one embodiment of a light conductor 10 with a radial inhomogeneous light distribution.

The same reference signs in different figures describe the same or at least functionally comparable elements respectively.

FIG. 1 shows an embodiment of the light conductor 10 in longitudinal section. The section is chosen in such a way that it exemplifies the complete optical path of the light 12, 14 between a light incidence area within a boundary area 16 of the light conductor and a light emitting area 18 of the light conductor. In FIG. 1, the section plane of the y-x plane is based on the right hand rule Cartesian coordinate system. At the same time this is one of the many second layers in the sense of the present application.

FIG. 2 shows a top view of the light conductor 10 o FIG. 1 in its complete form (not the sectional form). The drawing layer of FIG. 2 is at the same time a first layer in the sense of the present application or at least lies parallel to it.

FIGS. 1 and 2 show an arrangement made up of a light conductor 10 and a light source 20. The light source is arranged so close in front of a light incidence area of the light conductor that light emitting from it enters into the light conductor as a divergent light beam. The light incidence area is a part of the boundary area 16 located opposite to it, which is facing the light emitting area of the light source. The light source is preferably a semiconductor light source. The semiconductor light source consists of one or more light emitting diodes or laser diodes. It preferably has an almost even light emitting area. Semiconductor light sources are used for light equipments of motor vehicles, whose light emitting area has a edge length ranging from a few tenth of a millimeter to about 2 mm. The light emitting area is generally arranged close to the light incidence area, but without direct contact (for example, a distance of approximately one tenth of a millimeter). By this, a very efficient light coupling is achieved, where almost all the emitted light from the light source is coupled into the light conductor.

The light conductor 10 consists of an input coupler 22. The input coupler here includes a light incidence area, a first reflector 24, and a second reflector 26. The divergent light that is incident on the input coupler is the light beam emitting from the light source, which enters the inside of the light conductor through the light incidence area. In air, the opening angle is 90° (measured in perpendicular to the light emitting area of the light source of a LED with a Lambertian radiation characteristic). This opening angle is reduced at the coupling into the more optically dense light conductor material to approximately 42° with PMMA and 39° with PC. Because of the greater refraction, PC is preferred as light conductor material for realizing the invention. The shorter focal length of the rotationally symmetrical first reflector 24 can parallelize all rays of the 39°-beam by total internal reflection in the second layer.

In the object of FIGS. 1 and 2, the first layer is the x-z plane of a right hand rule Cartesian coordinate system. The drawing layer of FIG. 2 corresponds to such a second layer. The second layer is the y-z plane of this coordinate system and is thus spanned by a normal of the first layer and a line located in the first layer, whereby the starting point of the normal is a point on the line. The drawing layer of FIG. 1 is such a second layer. In the second layer, the first reflector is made in the shape of a parabola whose focal point is in the apparent origin of the divergent light beam of the light source. The apparent origin corresponds to the center of the light emitting area of the light source in the first approximation. However, it is slightly different from that location since the light emitting from the light source is broken toward the perpendicular at the entry into the more optically dense light conductor. In the layers parallel to the first layer, the first reflector features a circular contour so that the first reflector 24 can distribute the incident light into the first layers which run parallel to the x-z plane, in an even and homogeneous way by the angle directions of the full circle. The input coupler is designed in such a way that divergent incident light is coupled into the inside of the light conductor in such a way that it has a lower divergence in the second layers than in the first layers. In one embodiment, the light in the second layers expands in a parallel way, while it expands in a radial way in the first layers.

The large reduction of the divergence in the second layers is a result of the effect of the parabolic shape of the first reflector in the second layers. Ideally, this results in parallel propagated light in the second layers, as it is represented by the optical paths 12 and 14 or by the parts on the first reflector 24 in the light path behind the reflection of the optical paths. Because of the homogeneous distribution created by the angle directions of the full circle, there is a greater divergence in the first layers than in the second layers; there is no reduction of the divergence in the first layers with such a distribution, since the angle distribution of the light is not changed within the first layers through the reflection in the circular-shaped contours of the first reflector in the first layers.

The dotdashed line (which connects FIGS. 1 and 2), runs through the center of the light emission area of the light source in both figures and thus creates a reference between the two figures. Since it penetrates the light emission area of the light source in a perpendicular way (which is preferably realized with a light emission diode), it will be described as LED-axis 28. In the embodiment displayed in FIGS. 1 and 2, the LED-axis 28 separates a frontal section or half-space 30 facing the light emission area of the light conductor, and a rearward section of half-space 32 not facing the light emission area of the light conductor 10.

The second reflector 26 is allocated in the rear section 32 of the light conductor and, due to its noticeable roof-shaped cross section in FIG. 1, it is also described as roof-edge reflector. It features two reflection areas that stand perpendicular to each other. The point angle between the reflection areas of the roof-edge reflectors (which appear as edges in FIG. 1) is thus 90°. The roof-edge reflector features this cross section in all second layers.

In first layers (for example, in the drawing layer of FIG. 2), the roof-edge reflector 26 displays a semicircular shape, which, when viewed over the half-circle, it is concentrically towards the circular shape of the first reflector 24 and thus towards the rotational-LED-axis 32. Due to this special geometry, the roof-edge reflector reflects the radial incident light from the first reflector back into the same radial (second) layer. The reflected light in the second layer is deflected twice consecutively, rectangular to its respective incidence direction, so that it runs throughout the area between the first reflector and the light incidence area and returns to the frontal area or half-space facing the light emitting area of the light conductor. As a result, a ray that was reflected at the roof-edge reflector returns back, parallel offset towards the incident ray within the second layer. In the first layer, the reflected ray has the same angle as the incident ray and thus runs on the same radius. This is shown in the optical path in FIG. 1. The optical path 12 represents light which was reflected by the first reflector directly into the first half-space 30. The optical path 14 represents light which was initially reflected by the first reflector into the second half-space 32.

The first reflector is realized as a rotationally symmetrical deepening in a boundary area 34 located opposite of the light incidence area of the light conductor. The shape is formed by rotation of a parabola branch around the rotation axis 32, which goes through the center of the light emitting area of the light source and through the focal point of the parabola. The main axis of the parabola lies lateral to the rotation axis. The depth of the deepening corresponds to a value ranging from 40% to 60% of the distance (at the location of the deepening) between the boundary area 16, in which the light incidence area is located and the boundary area 34 which is located opposite the light incidence area of the light conductor.

If the frontal half-space 30 of the light conductor (which is facing the light emitting area 18 of the light conductor) is divided into a light source sided lower partial volume and a reflector sided upper partial volume, then the described reflections will result in the light which was initially reflected by the first reflector to the rear half-space is now reflected by the roof-edge reflector in such a way that it propagates in the lower partial volume of the frontal section with the same angle distribution in the first layers as the propagated light of the upper partial volume, which was reflected by the reflector directly into the first half-space. With reference to second layers, the light propagates in both partial volumes parallel to each other, as it is represented by the parallel optical paths 12, 14 on the right of reflector 24 in FIG. 1.

In addition to the input coupler producing a parallelizing in the second layer, the light conductor consists of a first deflection area 36, which deflects coupled in light that is incident on it. The deflection is preferably done in an angle which is at least as big as the product of the value of the critical angle of the total internal reflection and the factor 2. In one embodiment, the first deflection area is part of the boundary area 16. Further, the light conductor 10 consists of further deflection areas 38 which are illuminated with light coming from the first deflection area 36 and which direct light coming from the first deflection area into a preferred direction. In one embodiment, the preferred direction corresponds to the z-direction. The further deflection areas 38 are respective partial sections of the boundary area 34, which is located opposite to the boundary area 16. Positioning structures 40 rise from both boundary areas, which could alternatively or additionally be added or realized as deepenings.

FIGS. 1 and 2 (in particular, FIG. 2) illustrate the parallelizing effect on the light in the first layers. The propagated light that is illustrated by the optical paths 12 and 14 is deflected by the first deflection area 36 in y-direction respectively. Subsequently, the light is deflected by further deflection areas 38 in z-direction and it is also parallelized in respect to its distribution in the first layers.

The described parallelizing of the light beam, which is accomplished by a double reflection at an angle that is at least as big as the product of the value of the critical angle of the total internal reflection and the factor 2, whereby these reflections are done at the first deflection area 36 and at one of the respective further deflection areas 38, requires that the individual further deflection areas 38 area arranged in a certain way relative to each other and to the individually incident light at the respective deflection areas. The further deflection areas 38, in particular, must face the preferred direction. Their location is determined in such a way that the incident ray, the perpendicular to the deflection area, and the reflected ray have to be in the same layer, and that the direction of the reflected ray and the direction of the incident ray are fixed. The line along which the first deflection area 36 is arranged in the first layer serves as guiding line for aligning the further deflection areas 38. Because of the double deflection, the radial divergent light beam is made into a parallel aligned and homogeneous light beam. In one embodiment, this deflection is done at 90° respectively. Similarly, it is possible to transform a spherical radiation in three dimensions into such a parallel directed and homogeneous light beam by three deflections of 90° each. Due to the equal distribution of the light by the angles in the object of FIGS. 1 and 2, a radial light expansion results in a section of a circumference as guiding line for the arrangement of the first deflection areas and for the further deflection areas.

FIG. 3 displays a top view of an embodiment of the light conductor 10. In this embodiment, the length of the rays 42, 44, 46 may act as a measure for the light intensity of a partial beam which is contained in this whole beam. In the displayed example, the light intensity on the outside (rays 42, 46) is in particular stronger than on the inside (ray 44). This is an example of an elliptical light distribution; the light distribution of the emitted light of the input coupler in the z-direction is smaller than that in the x-direction.

In such a inhomogeneous light intensity distribution, it is preferred that the first deflection area 36 (which can be composed of the individual partial areas 36.1, 36.2, etc.) be arranged along an elliptical guiding line. For the directions 44 with comparatively lower light intensity, the corresponding partial area of the first deflection areas is arranged closer to the input coupler than a partial area of the first deflection area, which belongs to a partial beam with comparatively higher light intensity. The further deflection areas 38 are also arranged in such a way that they are illuminated by light that emanates from the first deflection area. For the described deflection, they are equally arranged along the elliptical guiding line. For light that is incident on the first deflection area 36, parallel to the first layer, and which is reflected parallel to the first layers by the further deflection areas 38, the first deflection area and the further deflection areas include an angle with the first layers respectively, that (at maximum) is as big as the value of the difference of a right angle and the critical angle of the total internal reflection. The maximal value results when the deflection at the deflection area is done at an angle which is twice as big as the critical angle of the total internal reflection.

The guiding line, which is arranged along the individual first and further deflection areas in its projection into the first layer, is ultimately defined by the directional characteristics of the light source and by the requirement that the light intensity distribution after the deflection at the first deflection areas and the further deflection areas be homogeneous. The layer in which the deflection is done is defined in that its perpendicular, the incident ray, and the reflected ray have to be in the same layer. The deflection layer of the first deflection area is thus particularly defined by the incident, radial ray, and the y-direction, since the y-direction defines the direction of the ray which is reflected at the first deflection area. The deflection area of the second deflection area is defined by the y-direction and the z-direction, since the y-direction gives the direction of the incident ray and the z-direction gives the direction of the reflected ray.

Figure 4:
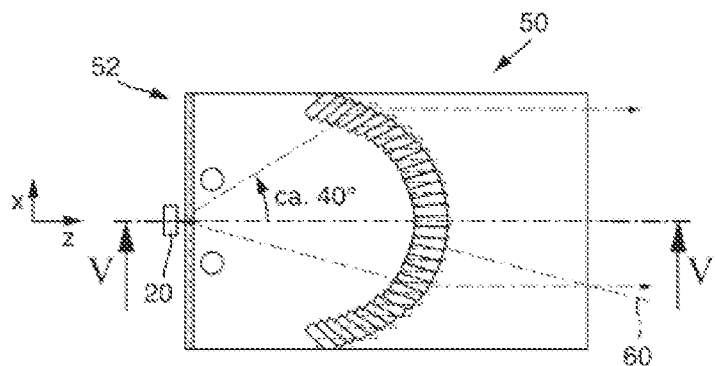
FIG. 4 An embodiment of the light conductor with a changed input coupler.

FIG. 4 shows a top view of a further embodiment of a light conductor 50. Here, the visible layer lies parallel to a first layer. In this embodiment, a differing input coupler is utilized. In the object of FIG. 4, the light source 20 is arranged closely in front of a narrow side 52 of the otherwise flat light conductor. The different input coupler is accompanied by a different light intensity distribution of the light propagated between the input coupler and the first deflection area. The coupled in light in FIG. 4 has an opening angle of approximately 40° to the perpendicular of the input area, whereby the exact value of the opening angle is dependent on the refractive index of the light conductor material. Within this opening angle, the light with this kind of input coupler is also not homogeneously distributed over the opening angle width. Rather, there is a light intensity maximum in the central main direction of the beam which is accompanied by a slight reduction of the light intensity toward the edges of the light beam. As was previously described, the first deflection areas are arranged along a guiding line which results as image of the inhomogeneous light intensity distribution of the coupled in light. Partial areas of the first deflection area for a partial beam with comparatively high light intensity in particular are arranged further away from the center of the light coupling than partial areas of the first deflection area for a partial beam with comparatively low light intensity.

In FIG. 4, central partial areas of the first deflection area are arranged further away from the light source than the partial areas of the deflection area that are situated farther outside. The partial areas of the first deflection areas are depicted by partial areas with solid lines, while the further deflection areas are depicted with dashed lines. This results in a guiding line 60 which deviates from the shape of a circular arc. In directions with higher light intensity, the deflection areas used for the second parallelization are arranged further away from the input coupler as in directions with lower light intensity. Reflecting the light from different incidence directions with the same strength into the same preferred direction with further deflection areas results in a compensation of the light intensity differences. The second parallelizing in particular allows for an additional homogenization of the light intensity of the parallelized light.

At the light emission area (reference sign 18 in FIG. 1), it is possible to implement cylinders, cushions, prisms, or other free-form surfaces in order to achieve a desired angle dependent light distribution. With this, it is possible to produce a government regulated light distribution for a signal light for motor vehicles made up of a ribbon-shaped light emission area 18 which appears homogeneously brightly illuminated.

Figure 4B:
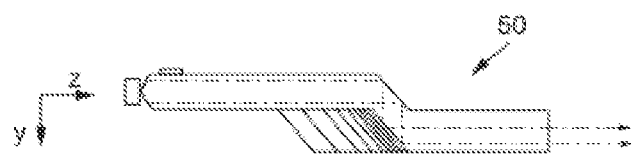

FIG. 4b shows a cross section of the embodiment of FIG. 4. A comparison of the FIGS. 1 and 4b shows that the arrangement on top of each other of the first deflection areas and further deflection areas of FIG. 1 is opposite of the object of FIG. 4b. The described function is not dependent of this arrangement.

Figure 5:
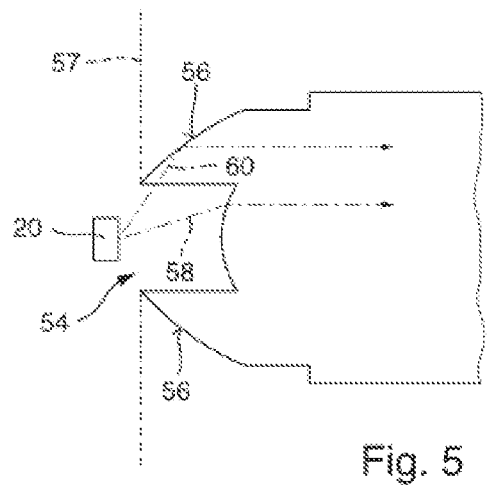
FIG. 5 The input coupler of FIG. 4 in cross selection.

FIG. 5 depicts the input coupler of the light conductor 50 from FIG. 4 in cross section which lies parallel to a second layer in the sense of the previous description. The input coupler features a lens-like shaped central area 54 and parabolic-like outer contours 56 in its edge area. The lens-like shaped central area is made in such a way that light incident on it 58 will be parallelized by it through refraction. The edge areas are shaped in such a way that they parallelize incident light 60 that enters through the inner areas of the input coupler by total reflection. The input coupler is accomplished in three dimensions through rotation around the axis 57 displayed in the cross section of FIG. 5 and in an angle of 180°. This, the input coupler causes the light in the drawing layer of FIG. 6 (which corresponds to the previously described second layer) to expand in a parallel way.

Figure 6A:
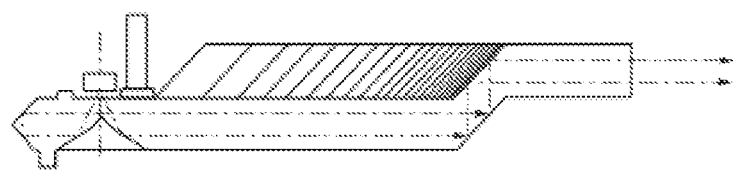
FIG. 6a-c Further embodiments of light conductors differentiated in the direction of the light decoupling.
Figure 6B:
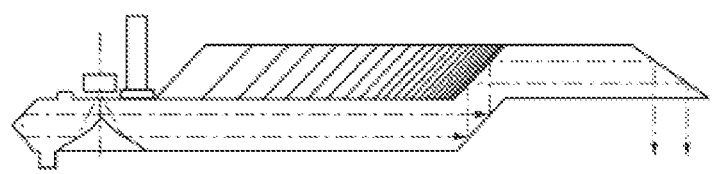
Figure 6A:
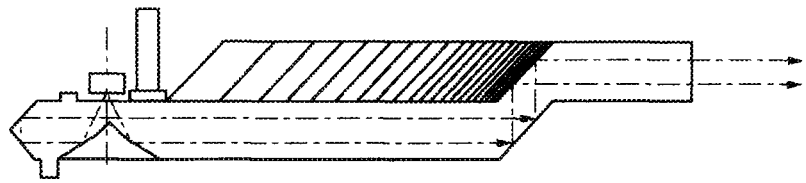
Figure 6B:
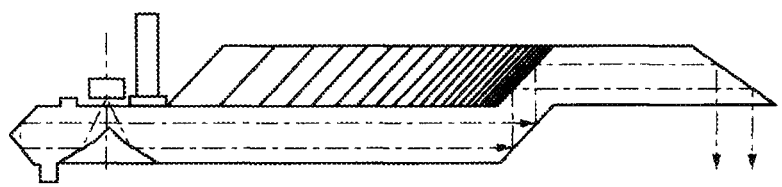
Figure 6C:
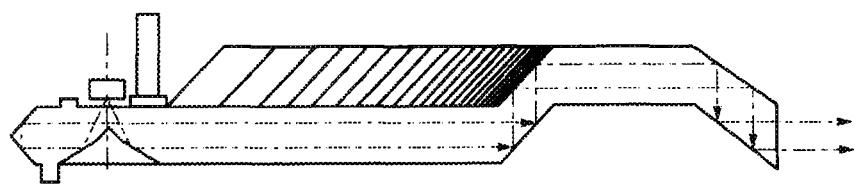

FIGS. 6a, 6b, and 6c display further embodiments of the light conductor. These figures illustrate that the input coupler of FIG. 1 with the light source can also be mirrored at the x-z plane in the otherwise unchanged light conductor 10 of FIG. 1. FIG. 6b illustrates that the light can receive another deflection at its out-coupling. FIG. 6c shows that the light can receive an alternative or additional parallel offset before its out-coupling. In the object of FIG. 6, the necessary deflections for this are made by even minor areas that are arranged at an angle to the incident light. Since these do not change the angle distribution of the incident light during reflection, the achieved parallelism and homogeneity remain the same. In the sections of the light path located between the further deflection areas, the light conductor may also display a curved course.

In one embodiment, the length of the light emission area 14 is greater than its fourfold width, particularly greater than its sixfold width, and specifically greater that its eightfold width. These specifications refer to the respective light conductor volume, which is fed by a light source, be it an individual semi conductor light source or a spatially combined array of several semi conductor light sources. FIGS. 1 to 6 feature embodiments of such light conductors.

If several spatially separate light sources are used, one light conductor volume is arranged for each light source, whereby such an arrangement is viewed as a unit cell. In such a case, it is preferred that the before mentioned ratios are applied for each unit cell. It is also possible to arrange two light emitting diodes per unit cell which emit light in a different color from the other, so close to each other that their light is coupled into the same light conductor volume. Depending on which of the two light emitting diodes is turned on, different light functions (such as daytime running light, position light and/or indicator light) can be fulfilled. With rear lights, it is also possible for three light emitting diodes to be arranged in this sense, whereby one of these will give a white, a red, and a yellow light respectively. Embodiments of the invention feature light conductors made up out of several light conductors of the FIGS. 1-6. It is thus possible to arrange several of those light conductors as unit cells of a greater light conductor in x-direction next to each other, whereby a particularly long and thin shining light emission area can be produced.

Figure 7:
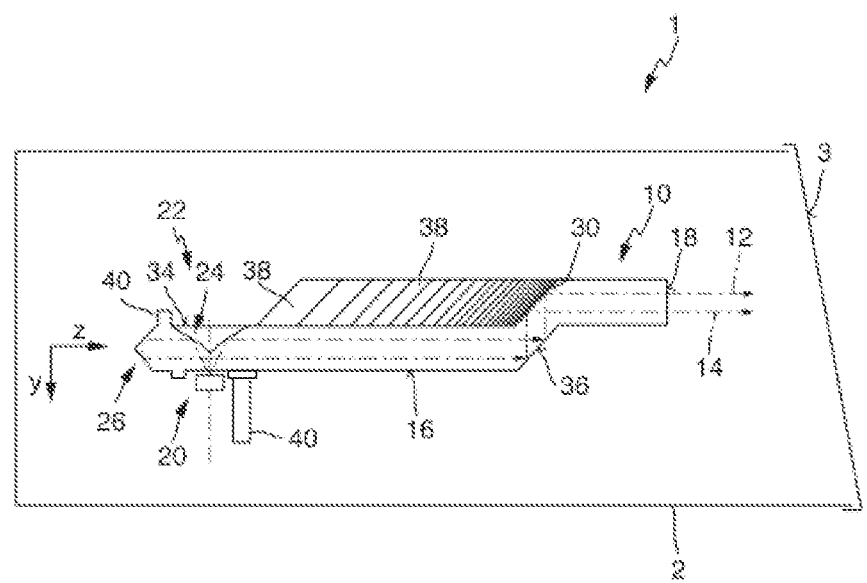
FIG. 7 An application of the light conductor in lighting equipment of a motor vehicle.

FIG. 7 shows one embodiment of the light conductor in light equipment of a motor vehicle 1 in sectional view. The light equipment of a motor vehicle 1 features a light conductor 10. The light conductor 10 of FIG. 1 corresponds to the one in FIG. 2. With reference to the given directions in connection with FIG. 1, the sectional view of FIG. 2 is in the y-z plane of the light conductor 10. The light equipment of a motor vehicle 18 consists of a housing 2 with a light aperture that is covered with a transparent cover screen 3. The light emission area of the light conductor faces the cover screen.

Modern light equipments of motor vehicles provide signal light distributions and/or headlight light distributions. A signal light distribution serves to indicate the presence of a motor vehicle and/or the intentions of its driver to other traffic participants. Headlight light distributions illuminate objects in the roadway of the motor vehicle and thus make them perceptible to the driver. The producing of a light distribution is also described as light function. Often, lighting equipment fulfills several light functions with the aid of one or more light modules, which are arranged in such lighting equipment. With headlights, which feature a sweep of one of the contours of the arrow-shaped front of the vehicle, the arrangement of the light conductor equipment is arranged angular. A compensation of an undesired refraction is preferably accomplished by rotating the input coupler unit or by using a step-like design of the light emission area.

The present invention serves to fulfill signal light functions (for example, daytime running lights, light functions, or indicator light functions). Thus, lighting equipment of the present invention may fulfill other (or multiple) lighting functions. Lighting equipment which features of one of the here described light conductors will also be viewed as invention. Embodiments of lighting equipments can be separate front lights (for indicator or daytime running lights) or they can refer to a front or rear light (which fulfills several light functions). It is preferred that the lighting equipment features at least two light emitting diodes which radiate light in different colors from the other, and which are arranged so close to each other in front of a light incidence area of the light conductor that their light is coupled into the same light conductor volume. Thus, by alternatively turning on one or the other light emitting diode, different light functions can be fulfilled with the same light conductor structure.

What is claimed is:

1. A light conductor (10) with an input coupler (24, 26) which is arranged in such a way that divergent incident light is coupled into the inside of the light conductor in such a way that the coupled in light (12, 14) propagates inside the light conductor in planes that are parallel to a first plane, and in second planes, whereby each second plane is spanned by a perpendicular of the first plane and by a line located in the first plane, and with a light emitting area (18), said input coupler acting to produce light that is coupled in such a way that it has a lower divergence in the second planes than in the first planes, said light conductor including a first deflection area between the input coupler and the light emitting area (18), which redirects light emitted from the input coupler incident on the first deflection area (36) in an angle which is at least as big as the product of the value of the critical angle of the total internal reflection and the factor 2 and a plurality of further deflection areas (38) which are illuminated with light emitted from the first deflection area and which each direct the incident light from the first deflection area into a preferred common direction of illumination (z) so as to produce a parallel, aligned and homogenous light beam from said light conductor.

2. A light conductor (10) as set forth in claim 1, wherein said input coupler includes a first reflector which is formed as a parabola in the second planes, whose focal point is in the apparent origin of the divergent incident light.

3. A light conductor (10) as set forth in claim 2 wherein said first reflector is realized as a rotationally symmetric deepening in a boundary area (34) opposite of the light incidence area of the light conductor.

4. A light conductor (10) as set forth in claim 3, wherein the depth of the deepening corresponds to a value between 40% and 60% of the distance between the boundary area (16) in which the light incidence area is located and the boundary area (34) opposite of the light incidence area of the light conductor, wherein 100% corresponds to a distance that would be present if no deepening were present.

5. A light conductor (10) as set forth in claim 3, wherein said input coupler further includes a second reflector which has, in the first planes, a semicircular form which is concentric to a circular shape of the rotationally symmetric deepening that establishes the first reflector (24).

6. A light conductor (10) as set forth in claim 5, wherein said second reflector (26) is positioned in a rear section (32) of the light conductor and includes a roof-shaped cross section established by reflection areas that are arranged to form an angle of 90°.

7. A light conductor (50) as set forth in claim 1, wherein said input coupler consists of a lens-shaped central area (54) and a border area with parabolic external contours (56).

8. A light conductor (10; 50) as set forth in claim 1, wherein said first deflection area is part of a boundary area (16) of the light conductor and said plurality of further deflection areas (38) are partial sections of a boundary area (34) which is opposite of that boundary area (16).

9. A light conductor (10; 50) as set forth in claim 1, wherein said first deflection area and said plurality of further deflection areas (38) each establish a respective angle with the first planes.

10. A light conductor (10; 50) as set forth in claim 9, wherein said first deflection area and said plurality of further deflection areas (38) are positioned and arranged in such a way that the light is deflected there by 90° respectively, whereby the alignment of said plurality of deflection areas (38) is determined in such a way that the incident ray, the perpendicular to the deflection area and the reflected ray have to be in the same plane and that the direction of the reflected ray is the preferred direction.

11. A light conductor (10; 50) as set forth in claim 1, wherein a line is arranged alongside the first deflection area (36) in a first layer as a guiding line (60) which serves for aligning further deflection areas (38).

12. A light conductor (10; 50) as set forth in claim 11, wherein said guiding line (60) has the shape of a section of a circumference.

13. A light conductor (10; 50) as set forth in claim 12, wherein a section of the first deflection area (36) for light from directions (44) with comparatively lower light intensity is arranged closer to the input coupler than a section of the first deflection area that belongs to a partial beam with comparatively higher light intensity.

14. A light conductor (10; 50) as set forth in claim 11, wherein said guiding line (60) is in the shape of a section of an ellipse.

15. Lighting equipment (1) of a motor vehicle with at least one light conductor, having an input coupler (24, 26) which is arranged in such a way that divergent incident light is coupled into the inside of the light conductor in such a way that the coupled in light (12, 14) propagates inside the light conductor in planes that are parallel to a first plane, and in second planes, whereby each second plane is spanned by a perpendicular of the first plane and by a line located in the first plane, and with a light emitting area (18), said input coupler acting to produce light that is coupled in such a way that it has a lower divergence in the second planes than in the first planes, said light conductor including a first deflection area between the input coupler and the light emitting area (18), which redirects light emitted from the input coupler incident on the first deflection area (36) in an angle which is at least as big as the product of the value of the critical angle of the total internal reflection and the factor 2 and a plurality of further deflection areas (38) which are illuminated with light emitted from the first deflection area and which each direct the incident light from the first deflection area into a preferred common direction (z) so as to produce a parallel, aligned and homogenous light beam from said light conductor.

* * * * *

UNITED STATES PATENT AND TRADEMARK OFFICE
CERTIFICATE OF CORRECTION

PATENT NO. : 9,528,682 B2
APPLICATION NO. : 14/102798
DATED : December 27, 2016
INVENTOR(S) : Matthias Gebauer It is certified that error appears in the above-identified patent and that said Letters Patent is hereby corrected as shown below:

In the Drawings

Please replace Fig. 6a and 6b with Fig. 6a, 6b and 6c as shown on the attached page.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*